Patented Aug. 28, 1928.

1,682,524

UNITED STATES PATENT OFFICE.

ANDREW C. JAMES, OF HOUSTON, TEXAS.

COMPOSITION OF MATTER.

No Drawing.    Application filed July 5, 1927. Serial No. 203,683.

This invention relates to new and useful improvements in a composition of matter, and the method of applying same.

One object of the invention is to provide a composition specially designed for use in treating metal which is to be fused onto another metal to form a hard coating on the latter.

Another object of the invention is to provide a composition of the character described which may be easily produced and readily applied, in coating electrodes or other metal which are to be welded, or fused, into a hard coating onto some other metal.

With the above and other objects in view this invention has particular relation to a certain novel composition to be used in coating metals, as more particularly hereinafter described.

The composition comprises powdered manganese, powdered titanium, powdered molybdenum, powdered chromium and silicate of soda combined substantially as and in the proportions hereinafter stated.

The composition is preferably formed by mixing the above ingredients in the proportion of approximately 20% manganese, 20% titanium, 5% molybdenum, 20% chromium and 35% silicate of soda. The manganese, molybdenum titanium and chromium should preferably be in a powdered form. When these ingredients are mingled together, they will form a fluid mass. The iron, steel or other metal to be fused, preferably in the form of electrodes, should be dipped into the composition and then subjected to heat of the required temperature which will result in the formation of a hard coating or surface on the metal electrodes so treated. When these electrodes, so treated, are fused or welded on to the metal to be coated, particularly to iron or steel, and an exceedingly hard and tough coating will be formed particularly adapting the coated metal for use in withstanding abrasion.

What I claim is:—

A composition of matter comprising manganese, chromium, titanium, molybdenum and silicate of soda mixed together in approximately the proportions of 20% each of manganese, titanium, and chromium and 5% of molybdenum and 35% of silicate of soda.

In testimony whereof I have signed my name to this specification.

ANDREW C. JAMES.